US012654137B2

(12) United States Patent
Moon et al.

(10) Patent No.: US 12,654,137 B2
(45) Date of Patent: Jun. 16, 2026

(54) WATER PURIFIER

(71) Applicant: COWAY CO., LTD., Gongju-si (KR)

(72) Inventors: Hyoungmin Moon, Seoul (KR);
Taehun Moon, Seoul (KR); Sung Han Yun, Seoul (KR); Doo Won Han, Seoul (KR); Jung Hun Lee, Seoul (KR);
Chan Jung Park, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 357 days.

(21) Appl. No.: 18/571,273

(22) PCT Filed: Jun. 2, 2022

(86) PCT No.: PCT/KR2022/007809
§ 371 (c)(1),
(2) Date: Dec. 18, 2023

(87) PCT Pub. No.: WO2022/265274
PCT Pub. Date: Dec. 22, 2022

(65) Prior Publication Data
US 2024/0278181 A1 Aug. 22, 2024

(30) Foreign Application Priority Data

Jun. 18, 2021 (KR) ........................ 10-2021-0079459
Jan. 17, 2022 (KR) ........................ 10-2022-0006555

(51) Int. Cl.
*B01D 65/02* (2006.01)
*B01D 35/06* (2006.01)
(Continued)

(52) U.S. Cl.
CPC ............. *B01D 65/02* (2013.01); *B01D 35/06* (2013.01); *B01D 39/2055* (2013.01);
(Continued)

(58) Field of Classification Search
None
See application file for complete search history.

(56) References Cited

U.S. PATENT DOCUMENTS 6,001,244 A * 12/1999 Salter ..................... B01D 65/02
210/90
10,442,708 B2 * 10/2019 Balidas ..................... C02F 1/48
(Continued)

FOREIGN PATENT DOCUMENTS

CN 106277391 A 1/2017
CN 110049941 A 7/2019
(Continued)

OTHER PUBLICATIONS

International Search Report issued Sep. 2, 2022 in PCT/KR2022/007809, filed on Jun. 2, 2022, 5 pages (with English Translation).
(Continued)

*Primary Examiner* — Krishnan S Menon
(74) *Attorney, Agent, or Firm* — Oblon, McClelland, Maier & Neustadt, L.L.P.

(57) ABSTRACT

A water purifier comprises: an RO filter including a non-filtration part, a filtration part, and a reverse osmosis membrane for filtering the raw water into the purified water; purified water and raw water storages; a flow channel through which the raw water and the purified water flow; valve modules selectively opened or closed to adjust the flow of the raw water and the purified water; a sterilization module for sterilizing the raw water from the non-filtration part; and a controller controlling the opening/closing of the valve modules and the sterilization module based on flow modes. In a flushing mode for cleaning the reverse osmosis membrane using the purified water, the controller opens/closes the valve modules so that the purified water flows into the non-filtration part and flushing discharge water from the (Continued)

non-filtration part flows toward the raw water storage, and drives the sterilization module to sterilize the flushing discharge water.

15 Claims, 11 Drawing Sheets

(51) Int. Cl.

| | |
|---|---|
| *B01D 39/20* | (2006.01) |
| *B01D 61/02* | (2006.01) |
| *B01D 61/04* | (2006.01) |
| *B01D 61/08* | (2006.01) |
| *B01D 61/10* | (2006.01) |
| *B01D 61/12* | (2006.01) |
| *C02F 1/00* | (2023.01) |
| *C02F 1/44* | (2023.01) |
| *C02F 1/467* | (2023.01) |
| *C02F 9/00* | (2023.01) |

(52) U.S. Cl.

CPC ........... *B01D 61/025* (2013.01); *B01D 61/04* (2013.01); *B01D 61/08* (2013.01); *B01D 61/10* (2013.01); *B01D 61/12* (2013.01); *C02F 1/008* (2013.01); *C02F 9/00* (2013.01); *B01D 2311/04* (2013.01); *B01D 2313/18* (2013.01); *B01D 2313/243* (2013.01); *B01D 2321/02* (2013.01); *B01D 2321/12* (2013.01); *C02F 1/001* (2013.01); *C02F 1/441* (2013.01); *C02F 1/467* (2013.01); *C02F 2201/005* (2013.01); *C02F 2301/046* (2013.01); *C02F 2301/066* (2013.01); *C02F 2303/04* (2013.01); *C02F 2303/16* (2013.01)

(56) References Cited

U.S. PATENT DOCUMENTS

| | | | | |
|---|---|---|---|---|
| 2013/0313191 A1* | 11/2013 | Wolf | .......................... | C02F 9/00 |
| | | | | 210/638 |
| 2014/0027379 A1* | 1/2014 | Volker | ................. | B01D 61/243 |
| | | | | 210/636 |
| 2014/0342444 A1* | 11/2014 | Minamino | ............. | C12M 47/10 |
| | | | | 435/294.1 |

FOREIGN PATENT DOCUMENTS

| | | | |
|---|---|---|---|
| CN | 112867546 | A | 5/2021 |
| EP | 1101544 | A1 | 5/2001 |
| JP | 2005-296158 | A | 10/2005 |
| JP | 2011-212628 | A | 10/2011 |
| JP | 2013-126631 | A | 6/2013 |
| JP | 2017-148793 | A | 8/2017 |
| JP | 2018-528066 | A | 9/2018 |
| JP | 2019-25456 | A | 2/2019 |
| KR | 2002-0093663 | A | 12/2002 |
| KR | 10-1205197 | B1 | 11/2012 |
| KR | 10-2017-0105940 | A | 9/2017 |
| KR | 10-1897563 | B1 | 9/2018 |
| KR | 20210039065 | A | 4/2021 |
| KR | 10-2021-0048149 | A | 5/2021 |
| WO | WO 2009/128328 | A1 | 10/2009 |

OTHER PUBLICATIONS

Japanese Office Action issued Jan. 7, 2025, in corresponding Japanese Patent Application No. 2023-577226 (with English Translation), 6 pages.

Office Action issued Dec. 12, 2025 in Chinese Patent Application No. 202280043439.5 citing Documents 1-6 therein.

* cited by examiner

WATER PURIFIER

TECHNICAL FIELD

The present disclosure relates to a water purifier.

BACKGROUND ART

In general, a water purifier is a device that receives raw water from a raw water source such as tap water, filters the raw water into purified water through a filter provided therein, and then provides the purified water to a user. In addition, the purified water can be provided to the user as cold water cooled below a predetermined temperature or hot water heated above a predetermined temperature.

Such a conventional water purifier may include a raw water tank for storing raw water, a reverse osmosis filter (RO filter) for filtering the raw water, and a storage tank for storing purified water filtered by the RO filter. The RO filter may include a non-filtration part in which raw water is introduced, a reverse osmosis membrane capable of filtering the raw water, and a filtration part in which purified water filtered by the reverse osmosis membrane is received. In other words, some of the raw water is filtered by the reverse osmosis membrane to be purified water and received in the filtration part, and the remaining raw water unfiltered may become concentrate water containing impurities to be received in the non-filtration part.

Meanwhile, water purifiers are usually connected to water pipes, but in cases where connection to a water pipe is difficult or the water purifier needs to be portable, an install-free water purifier which includes a water supply tank that stores raw water and does not require connection to a water pipe is used. In other words, the install-free water purifier does not receive raw water directly from a water pipe, but receive raw water from the water supply tank. Further, there is a problem that the longer the raw water remains in the water supply tank, the more contaminated the raw water may become.

In this regard, Korean Patent Application Publication No. 10-2016-0005319 entitled "Water purifier capable of recycling domestic water" (Patent Reference 1) of the present applicant discloses a water purifier including a water supply tank for storing raw water and domestic water, a reverse osmosis filter section for filtering raw water and discharging domestic water, and a purified water tank for storing purified water filtered by the reverse osmosis filter section.

However, the raw water in the water supply tank of Patent Document 1 is filtered into purified water by the reverse osmosis filter section to be supplied to the purified water tank only when the water level in the purified water tank becomes low and it is necessary to replenish the purified water, so the raw water in the water supply tank and the purified water in the purified water tank are not circulated separately. In other words, when the water level in the purified water tank is maintained for a long time, the raw water and the purified water are stored in the water supply tank and the purified water tank for a long time and may become contaminated.

In addition, the domestic water in Patent Document 1 contains impurities, which may further contaminate the raw water in the water supply tank when the domestic water flows into the water supply tank.

Further, Korean Patent Application Publication No. 10-2013-0077383 entitled "Water purifier" of the present applicant (Patent Document 2) discloses a water purifier including a filter part that purifies water through reverse osmosis, a main tank that stores purified water that has passed through the filter part, and a water supply tank that supplies water to be purified and stores domestic water discharged from the filter part.

However, the water in the water supply tank of Patent Document 2 is filtered by a reverse osmosis filter part to be supplied to the main tank as purified water only when the main tank needs to be replenished with purified water, so the water in the water supply tank and the purified water in the purified water tank are not separately circulated. In other words, when there is no need to replenish the purified water in the main tank, the water and the purified water are stored in the water supply tank and the main tank in a stagnant state for a long time and may become contaminated.

Furthermore, the domestic water in Patent Document 2 contains impurities, which may further contaminate the raw water in the water supply tank when the domestic water flows in the water supply tank.

PRIOR ART DOCUMENT (Patent Document 1) Korean Patent Application Publication No. 10-2016-0005319 (published on Jan. 14, 2016)
(Patent Document 2) Korean Patent Application Publication No. 10-2013-0077383 (published on Jul. 9, 2013)

DETAILED DESCRIPTION OF INVENTION

Technical Problems

In view of the above, one embodiment of the present disclosure provides a water purifier capable of allowing raw water stored in a raw water storage unit and purified water stored in a purified water storage unit to be circulated.

Further, one embodiment of the present disclosure provides a water purifier capable of preventing contamination of the raw water in the raw water storage unit when the raw water is circulated in the water purifier.

Furthermore, one embodiment of the present disclosure provides a water purifier capable of cleaning a filter member.

Technical Solution

In accordance with one embodiment of the present disclosure, there is provided a water purifier comprising: an RO filter including a non-filtration part into which raw water flows, a filtration part which discharges purified water, and a reverse osmosis membrane that partitions the non-filtration part and the filtration part and filters the raw water into the purified water; a purified water storage unit for storing the purified water; a raw water storage unit for storing the raw water; a flow channel that provides a passage through which the raw water and the purified water flow; a valve unit including one or more valve modules selectively opened and closed to control the flow of the raw water and the purified water in the flow channel; a sterilization module for sterilizing the raw water discharged from the non-filtration part; and a controller for controlling the opening/closing of the valve modules and controlling the sterilization module based on a plurality of flow modes, wherein the plurality of flow modes includes a flushing mode for flushing the reverse osmosis membrane with the purified water from the purified water storage unit, and in the flushing mode, the controller opens/closes the one or more valve modules such that the purified water discharged from the purified water storage unit flows into the non-filtration part and flushing discharge water discharged from the non-filtration part flows toward the raw water storage unit, and drives the sterilization module to sterilize the flushing discharge water.

Further, the water purifier may further comprise: a filter module including a pre-treatment filter for pre-treating the raw water supplied to the RO filter, wherein the plurality of flow modes may further include a raw water sterilization mode for sterilizing the raw water stored in the raw water storage unit, and in the raw water sterilization mode, the controller may open/close the one or more valve modules such that the raw water flows into the non-filtration part through the pre-treatment filter and the raw water discharged from the non-filtration part flows into the raw water storage unit, and drives the sterilization module.

Further, the controller may open/close the one or more valve modules such that the purified water discharged from the filtration part flows into the purified water storage unit in the raw water sterilization mode.

Further, the plurality of flow modes may further include a purified water circulation mode in which the purified water stored in the purified water storage unit circulates through the flow channel, and in the purified water circulation mode, the controller may open/close the one or more valve modules such that the purified water stored in the purified water storage unit and the raw water stored in the raw water storage unit flow into the non-filtration part, and the purified water discharged from the filtration part flows into the purified water storage unit.

Further, in the purified water circulation mode, the raw water may be discharged from the non-filtration part and may flow into the raw water storage unit, and the controller may drive the sterilization module in the purified water circulation mode.

Further, the water purifier may further comprise: a filter module including a post-treatment filter for post-treating the purified water discharged from the filtration part, wherein the purified water may flow into the purified water storage unit through the post-treatment filter in the purified water circulation mode.

Further, the flow channel may include: an RO filter inlet passage which communicates with the raw water storage unit and provides a passage for either the raw water or the purified water to flow into the RO filter; a purified water supply passage which is joined to the RO filter inlet passage and provides a passage for the purified water discharged from the purified water storage unit to flow into the RO filter inlet passage; a circulation passage which provides a passage for the raw water discharged from the non-filtration part to flow into the raw water storage unit and communicates with the raw water storage unit; and a purified water storage passage which provides a passage for the purified water discharged from the filtration part to flow into the purified water storage unit, and the sterilization module may be disposed in the circulation passage.

Further, the purified water storage unit and the raw water storage unit may be formed separately from each other.

Further, the purified water storage unit and the raw water storage unit may be integrally formed.

In accordance with another embodiment of the present disclosure, there is provided a water purifier comprising: a filter member including an inlet through which raw water is introduced, a first filtration part for filtering the raw water introduced through the inlet to provide first filtrated water, a second filtration part for re-filtering the first filtrated water to provide second filtrated water, a first outlet for outputting the first filtered water, and a second outlet for outputting the second filtered water; a raw water storage unit that stores the raw water; a flow channel providing a passage through which the raw water, the first filtered water, and the second filtered water flow; a valve unit including one or more valve modules that are selectively opened/closed to control the flow of the raw water, the first filtered water, and the second filtered water in the flow channel; a sterilization module for sterilizing the first filtered water output from the first outlet and the second filtered water output from the second outlet; and a controller for controlling the opening/closing of the valve module based on a plurality of flow modes and controlling the sterilization module, wherein the plurality of flow modes include a raw water sterilization mode for sterilizing the raw water of the raw water storage unit, the controller opens/closes the one or more valve modules in the raw water sterilization mode such that the raw water discharged from the raw water storage unit flows into the first filtration part through the inlet, and the first filtrated water output from the first outlet flows into the raw water storage unit via the sterilization module, and the sterilization module sterilizes the first filtered water in the raw water sterilization mode.

The plurality of flow modes include a filter cleaning mode for cleaning the filter member, the controller may open/close the one or more valve modules in the filter cleaning mode such that the raw water discharged from the raw water storage unit flows into the inlet, and the second filtered water output from the second outlet flows toward the raw water storage unit, and the sterilization module may sterilize the second filtered water in the filter cleaning mode.

The water purifier may further comprise: a pump unit for pressurizing the raw water into the inlet, and the pump unit may pressurize the raw water with a predetermined first pressing force so that the raw water flows through the inlet into the first filtration part in the raw water sterilization mode, and pressurize the raw water with a predetermined second pressing force so that the raw water passes through the first filtration part through the inlet and flows into the second filtration part in the filter cleaning mode, the second pressing force being greater than the first pressing force.

The flow channel may include: a filter inlet passage connected to the raw water storage unit and the inlet to provide a passage for the raw water to flow between the raw water storage unit and the inlet; and a circulation passage connected to the first outlet and the raw water storage unit to provide a passage for the first filtered water output from the first outlet to flow into the raw water storage unit, and the sterilization module may be provided in the circulation passage.

The flow channel may further include: a flow passage joined to the circulation passage to provide a passage for the second filtered water output from the second outlet to flow, a portion where the flow passage and the circulation passage are joined may be located between the first outlet and the sterilization module on the circulation passage, and the second filtered water flowing in the flow passage may flow to the raw water storage unit through the circulation passage.

The first filtration part may include a nanotrap filter or an electrostatic filter, and the second filtration part may include a carbon filter.

Effect of Invention

According to one embodiment of the present disclosure, raw water can be circulated in the raw water sterilization mode, so that the raw water can be managed efficiently, and purified water can be circulated in the purified water circulation mode, so that purified water can be managed efficiently.

In addition, since the raw water can be sterilized by the sterilization module, it is possible to prevent contamination of the raw water in the raw water storage unit.

Further, the flushing discharge water or the raw water can be sterilized by the sterilization module in the flushing mode, the raw water sterilization mode, and the purified water circulation mode, thereby preventing the raw water in the raw water storage unit from being contaminated.

Furthermore, the filter member can be cleaned in the filter cleaning mode, thereby keeping the filter member used clean.

BEST MODE FOR CARRYING OUT THE INVENTION

Hereinafter, specific embodiments for implementing the technical ideas of the present disclosure will be described in detail with reference to the drawings.

In addition, in describing the present disclosure, when it is determined that a detailed description of the relevant known configuration or function may obscure the main idea of the present disclosure, the detailed description thereof will be omitted.

Further, when a component is mentioned to be "connected," "supplied," or "flowing" to another component, it should be understood that it may be directly connected to, supported by, supplied to, or flowing to another component, but there may be other components therebetween.

The terms used in the present specification are used merely to describe the specific embodiments and are not intended to limit the present disclosure. Singular expressions include the plural unless the context clearly indicates otherwise.

Further, in the present specification, it should be noted that expressions such as upper, lower, side, and the like are described with reference to the drawings and may be expressed differently when the orientation of the subject matter is changed. Similarly, in the accompanying drawings, some components are exaggerated, omitted, or shown schematically, and the dimensions of each component do not necessarily reflect actual dimensions.

Furthermore, the terms containing ordinal numbers, such as first, second, etc., may be used to describe various components, but the components are not limited by such terms. These terms are used only to distinguish one component from another.

The meaning of "include" used in the present specification is intended to specify certain features, areas, integers, steps, operations, elements, and/or components, and is not intended to exclude the existence or the addition of other specific features, areas, integers, steps, operations, elements, components, and/or groups.

Hereinafter, a water purifier 1 according to a first embodiment of the present disclosure will be described with reference to the drawings.

Figure 1:
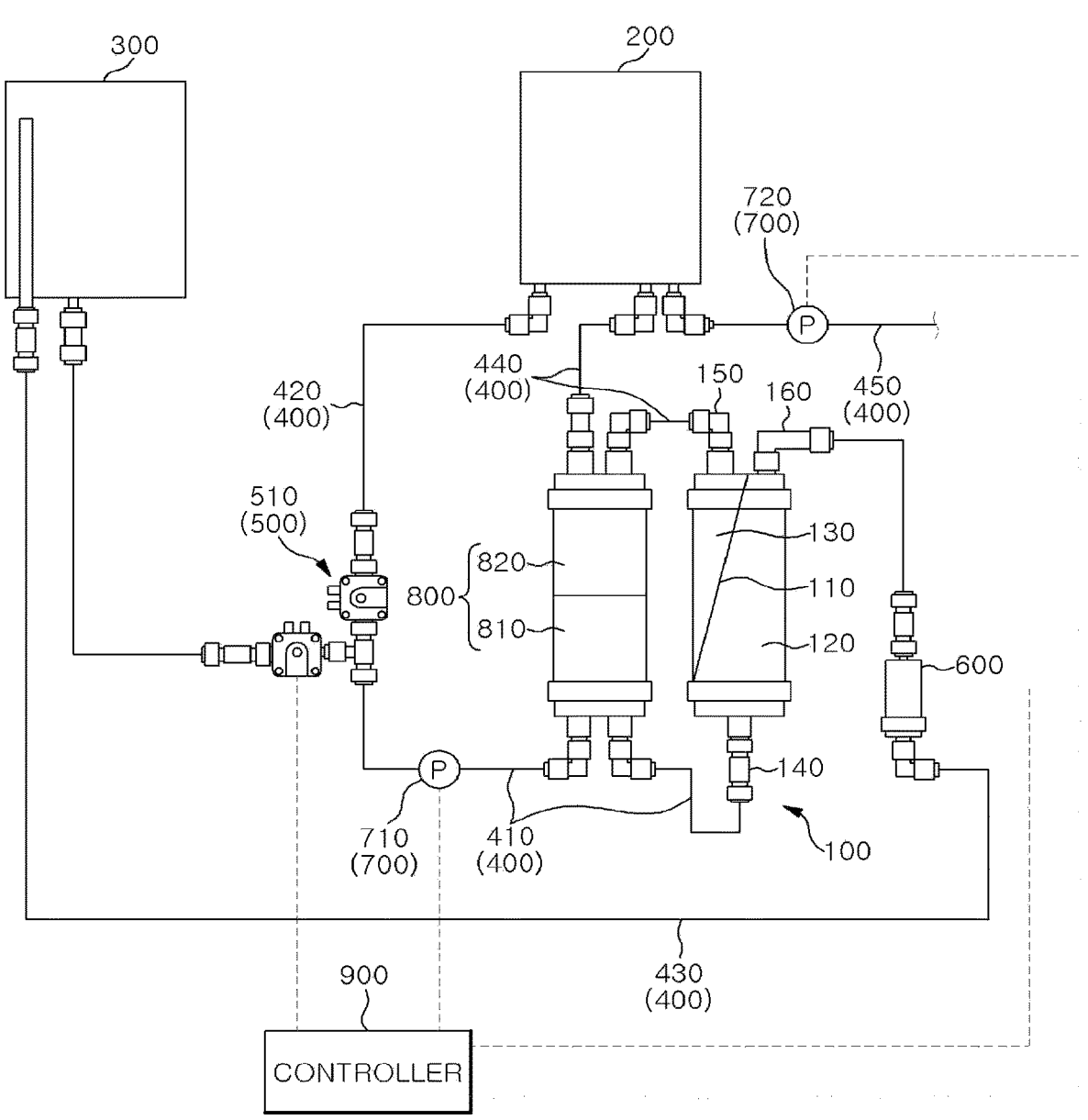
FIG. 1 is a diagram showing a water purifier according to a first embodiment of the present disclosure.

Referring to FIG. 1, the water purifier 1 according to the first embodiment of the present disclosure can provide clean water to a user by filtering water. For example, the water purifier 1 may filter water that is pre-stored therein. The water purifier 1 may control the flow of water in the water purifier 1 based on a plurality of flow modes. Further, the water purifier 1 may be an install-free water purifier that does not require a connection to a water pipe. The water purifier 1 may include an RO filter 100, a purified water storage unit 200, a raw water storage unit 300, a flow channel 400, a valve unit 500, a sterilization module 600, a pump unit 700, a filter module 800, and a controller 900.

The RO filter 100 is a reverse osmosis filter, and may filter some of raw water flowing therein to be provided as purified water. Raw water is defined herein as water that is not filtered by the RO filter 100, regardless of whether it is filtered by a pre-treatment filter 810 to be described later of the filter module 800, and purified water is defined as water that is filtered by the RO filter 100, regardless of whether it is filtered by a post-treatment filter 820 to be described later of the filter module 800. In addition, flushing water may be defined as purified water stored in the purified water storage unit 200 for flushing of the RO filter 100. Further, flushing discharge water is defined as water that has been introduced into the RO filter 100 to flush the RO filter 100.

The RO filter 100 may include a reverse osmosis membrane 110, a non-filtration part 120, a filtration part 130, a filter inlet 140, a purified water outlet 150, and a raw water outlet 160.

The reverse osmosis membrane 110 may partition the non-filtration part 120 and the filtration part 130 and filter the raw water into purified water. In other words, some of the raw water flowing into the RO filter 100 may be filtered by the reverse osmosis membrane 110 and discharged as purified water through the purified water outlet 150, while the remaining raw water that has not passed through the reverse osmosis membrane 110 may be discharged through the raw water outlet 160.

The non-filtration part 120 is a space which is connected to the filter inlet 140 and in which at least one of raw water (in a raw water sterilization mode and a water circulation mode) and purified water (in a flushing mode and a water circulation mode) introduced through the filter inlet 140 is received. In addition, the non-filtration part 120 may communicate with the raw water outlet 160. Impurities contained in the raw water may not pass through the reverse osmosis membrane 110 and may accumulate in the non-filtration part 120. The raw water containing impurities that have accumulated in the non-filtration part 120 may be discharged to the outside of the RO filter 100 through the raw water outlet 160. While a significant amount of the impurities introduced into the RO filter 100 are discharged to the outside of the RO filter 100 through the discharge of the raw water, some impurities may be adsorbed by the reverse osmosis membrane 110 and may not be discharged when the raw water is discharged. The impurities adsorbed on the reverse osmosis membrane 110 may be flushed out through the purified water flowing into the non-filtration part 120 and separated from the reverse osmosis membrane 110. In other words, the non-filtration part 120 and the reverse osmosis membrane 110 may be cleaned by purified water flowing into the non-filtration part 120.

The filtration part 130 is a space in which the purified water filtered by the reverse osmosis membrane 110 is received. In addition, the filtration part 130 may communicate with the purified water outlet 150, and the purified water in the filtration part 130 may be discharged to the outside of the RO filter 100 through the purified water outlet 150.

The filter inlet 140 is an aperture for allowing the non-filtration part 120 to communicate with the RO filter inlet passage 410 of the flow channel 400. Purified water or raw water flowing in the RO filter inlet passage 410 may be introduced into the non-filtration part 120 through the filter inlet 140.

The purified water outlet 150 is an aperture for discharging purified water filtered through the reverse osmosis membrane 110 to the outside of the RO filter 100. The purified water from the filtration part 130 may be discharged through the purified water outlet 150 into a purified water storage passage 440 to be described later of the flow channel 400.

The raw water outlet 160 is an aperture for discharging raw water received in the non-filtration part 120 to a circulation channel 430 to be described later of the flow channel 400. In addition, the raw water outlet 160 may discharge flushing discharge water such that flushing discharge water flushing the reverse osmosis membrane 110 and the non-filtration part 120 flows into the circulation channel 430. In other words, raw water or flushing water may be discharged through the raw water outlet 160 into the circulation channel 430.

The purified water storage unit 200 may store purified water. The purified water may be discharged out of the water purifier 1 and provided to the user. Further, the purified water stored in the purified water storage unit 200 may be provided to the non-filtration part 120 of the RO filter 100 as flushing water through the RO filter inlet passage 410 of the flow channel 400.

The raw water storage unit 300 may store raw water. The raw water may be provided to the RO filter 100 through the RO filter inlet passage 410 of the flow channel 400. Further, the raw water storage unit 300 and the purified water storage unit 200 may be formed separately from each other. In other words, the raw water storage unit 300 and the purified water storage unit 200 may be spaced apart from each other. Furthermore, the raw water storage unit 300 is not connected to a water pipe.

The flow channel 400 may provide a passageway for raw water and purified water to flow. The raw water and the purified water may flow between the purified water storage unit 200, the raw water storage unit 300, and the RO filter 100 through the flow channel 400. Further, the flow channel 400 may include an RO filter inlet passage 410, a purified water supply passage 420, a circulation passage 430, a purified water storage passage 440, and a purified water discharge passage 450.

The RO filter inlet passage 410 may provide a passage for introducing water into the non-filtration part 120 of the RO filter 100. The water flowing in the RO filter inlet passage 410 may be determined to be either raw water or purified water depending on the flow mode (flushing mode, raw water sterilization mode, purified water circulation mode, purified water discharge mode). The RO filter inlet passage 410 may communicate with the raw water storage unit 300 and the filter inlet 140 of the RO filter 100. For example, the RO filter inlet passage 410 may be disposed between the raw water storage unit 300 and the non-filtration part 120 of the RO filter 100. Further, the RO filter inlet passage 410 may be divided into a flow path connected to the raw water storage unit 300 and the filter module 800 and a flow path connected to the filter module 800 and the RO filter 100.

The purified water supply passage 420 may provide a passage through which purified water discharged from the purified water storage unit 200 flows. The purified water supply passage 420 may communicate with the purified water storage unit 200 and may be connected to the RO filter inlet passage 410. In other words, purified water flowing in the purified water supply passage 420 may flow into the RO filter inlet passage 410. For example, the purified water supply passage 420 may be disposed between the purified water storage unit 200 and the RO filter inlet passage 410. In the present embodiment, the purified water supply passage 420 is described as being connected to the RO filter inlet passage 410, but it may also be directly connected to the filter module 800 or directly connected to the filter inlet 140.

The circulation passage 430 may provide a passage through which raw water or flushing discharge water discharged from the non-filtration part 120 of the RO filter 100 flows. In addition, the circulation passage 430 may communicate with the raw water storage unit 300 and the raw water outlet 160 of the RO filter 100. Raw water or flushing discharge water flowing in the circulation passage 430 may flow to the raw water storage unit 300.

The purified water storage passage 440 may provide a passage through which purified water discharged from the RO filter 100 flows. The purified water storage passage 440 may communicate with the purified water storage unit 200 and the purified water outlet 150 of the RO filter 100. In other words, purified water flowing in the purified water storage passage 440 may flow to the purified water storage unit 200.

The purified water discharge passage 450 may provide a passage for discharging purified water from the purified water storage unit 200 to the outside of the water purifier 1. The purified water discharge passage 450 may communicate with the purified water storage unit 200. In other words, purified water discharged from the purified water storage unit 200 may be discharged to the outside of the purifier 1 through the purified water discharge passage 450.

The valve unit 500 may include one or more valve modules that are selectively opened and closed to control the flow of raw water and purified water in the flow channel 400. For example, when the flow channel 400 includes the RO filter inlet passage 410, the purified water supply passage 420, the circulation passage 430, the purified water storage passage 440, and the purified water discharge passage 450 as described above, the valve unit 500 may open and close each flow path included in the flow channel 400 to control the flow of water. The one or more valve modules may be a three-way valve provided at points where the flows are branched or jointed for flow of the raw water and the purified water, as shown in FIG. 1, but the idea of the present disclosure is not limited thereto, and a general opening/closing valve may be provided in each passage. The one or more valve modules may include a first valve module 510.

The first valve module 510 may open/close the purified water supply passage 420 so that raw water flows into the RO filter 100 or purified water flows into the RO filter inlet passage 410. In other words, the first valve module 510 may close the purified water supply channel 420 to prevent water from flowing from the RO filter inlet passage 410 into the purified water supply passage 420 and to prevent purified water from flowing into the RO filter inlet passage 410. In addition, the first valve module 510 may open the purified water supply passage 420 to allow purified water flowing in the purified water supply passage 420 to flow into the RO filter 100. For example, the first valve module 510 may be a three-way valve disposed at the point where the RO filter inlet passage 410 and the purified water supply passage 420 are joined.

The sterilization module 600 may sterilize raw water or flushing discharge water discharged from the non-filtration part 120 and flowing in the circulation passage 430. In other words, the sterilization module 600 may be disposed in the circulation passage 430. The sterilization module 600 may provide sterilizing substances to raw water or flushing discharge water or sterilize the raw water or flushing discharge water through electrolysis.

The pump unit 700 may pressurize the raw water to pass through the reverse osmosis membrane 110, and pressurize the purified water to the RO filter 100 or to the outside. The pump unit 700 may include a first pump 710 and a second pump 720.

The first pump 710 may pressurize one or more of raw water and purified water flowing in the RO filter inlet passage 410 to the RO filter 100. In addition, the first pump 710 may be connected to the RO filter inlet passage 410 to pressurize raw water and purified water. The first pump 710 may be provided between the first valve module 510 and the pre-treatment filter 810 or between the pre-treatment filter 810 and the RO filter 100 in the RO filter inlet passage 410.

The second pump 720 may pressurize the purified water flowing in the purified water discharge passage 450 to flow out of the water purifier 1. The second pump 720 may be provided in the purified water discharge passage 450.

The filter module 800 may additionally filter raw water or purified water flowing inside the water purifier 1. In other words, the filter module 800 may pre-treat raw water or purified water flowing into the RO filter 100, or post-treat the purified water discharged from the RO filter 100. The filter module 800 may include a pre-treatment filter 810 and a post-treatment filter 820.

The pre-treatment filter 810 may filter raw water or purified water flowing in the RO filter inlet passage 410 before it flows into the RO filter 100. For example, the pre-treatment filter 810 may be a carbon filter containing granular activated carbon for filtering raw water or purified water. The pre-treatment filter 810 may be connected to the RO filter inlet passage 410. For example, the pre-treatment filter 810 may be connected to the RO filter inlet passage 410 to be located between the first valve module 510 and the RO filter 100.

The post-treatment filter 820 may filter purified water flowing in the purified water storage passage 440 before it flows into the purified water storage unit 200. For example, the post-treatment filter 820 may be a carbon filter containing granular activated carbon for filtering raw water or purified water. The post-treatment filter 820 may be connected to the purified water storage passage 440. In addition, the post-treatment filter 820 and the pre-treatment filter 810 may be formed as one integrated filter.

The controller 900 may control the opening/closing of one or more valve modules based on a plurality of flow modes. The controller 900 may be implemented by a computing device including a microprocessor, a memory, etc., and since the implementation method is obvious to those skilled in the art, further detailed description thereof will be omitted. The plurality of flow modes may include a flushing mode, a raw water sterilization mode, a purified water circulation mode, and a purified water discharge mode.

Figure 2:
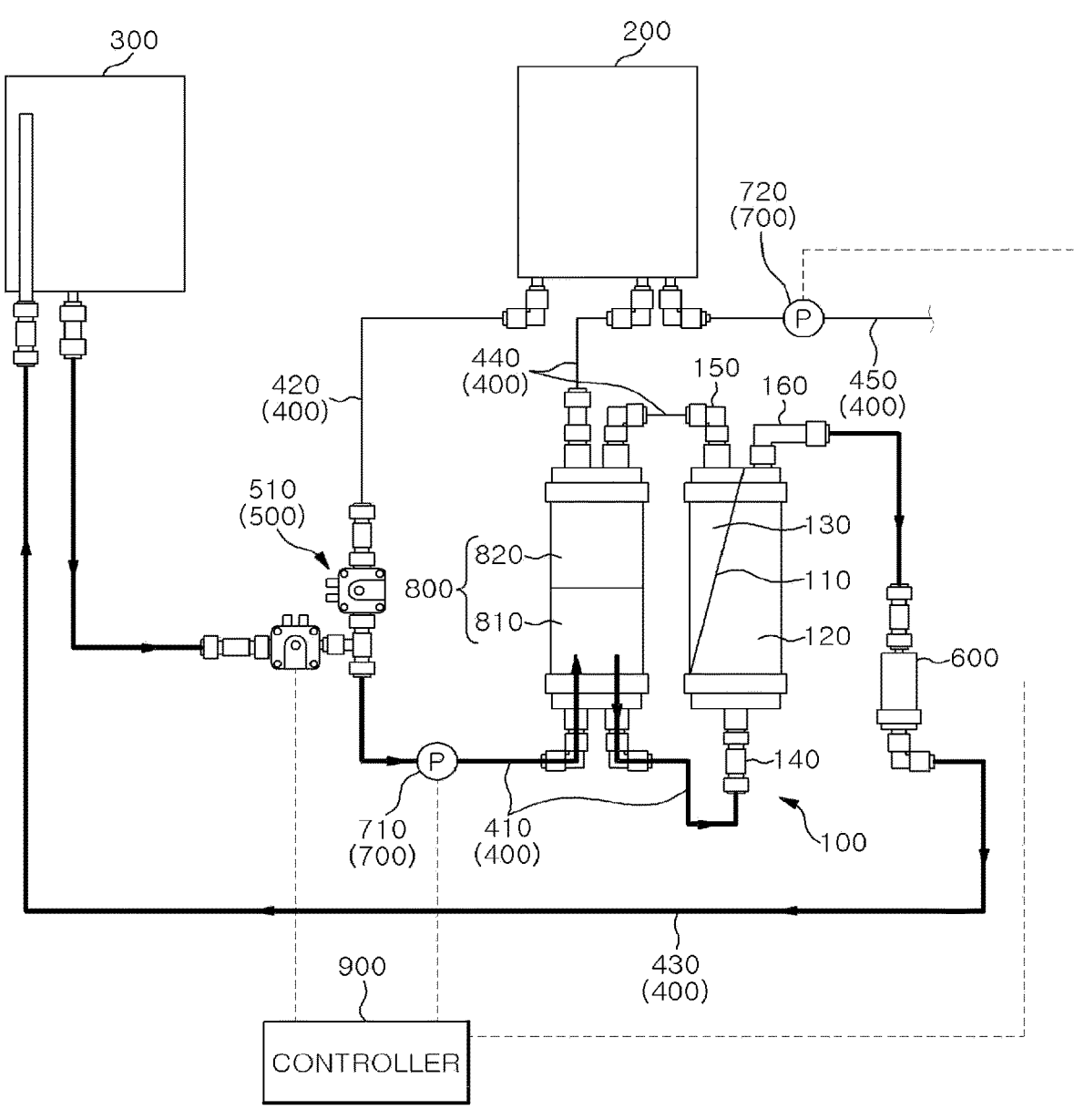
FIG. 2 is a diagram illustrating flow paths of raw water and purified water in a flushing mode in FIG. 1.

The flushing mode will be described with reference to FIG. 2. The flushing mode is a mode in which the reverse osmosis membrane 110 can be cleaned with purified water from the purified water storage unit 200. In the flushing mode, the controller 900 may control the passage opening/closing of one or more valve modules such that the purified water discharged from the purified water storage unit 200 flows into the not-filtration part 120 of the RO filter 100, and the flushing discharge water discharged from the not-filtration part 120 flows to the raw water storage unit 300. In other words, in the flushing mode, the controller 900 may control the first valve module 510 to open the RO filter inlet passage 410 and the purified water supply passage 420. In addition, in the flushing mode, purified water may flow into the non-filtration part 120 via the pre-treatment filter 810.

Further, in the flushing mode, the controller 900 may drive the sterilization module 600 to sterilize the flushing discharge water discharged from the non-filtration part 120. In other words, in the flushing mode, sterilized flushing discharge water may flow into the raw water storage unit 300.

In addition, in the flushing mode, the first pump 710 may pressurize purified water flowing in the RO filter inlet passage 410 to the RO filter 100.

Figure 3:
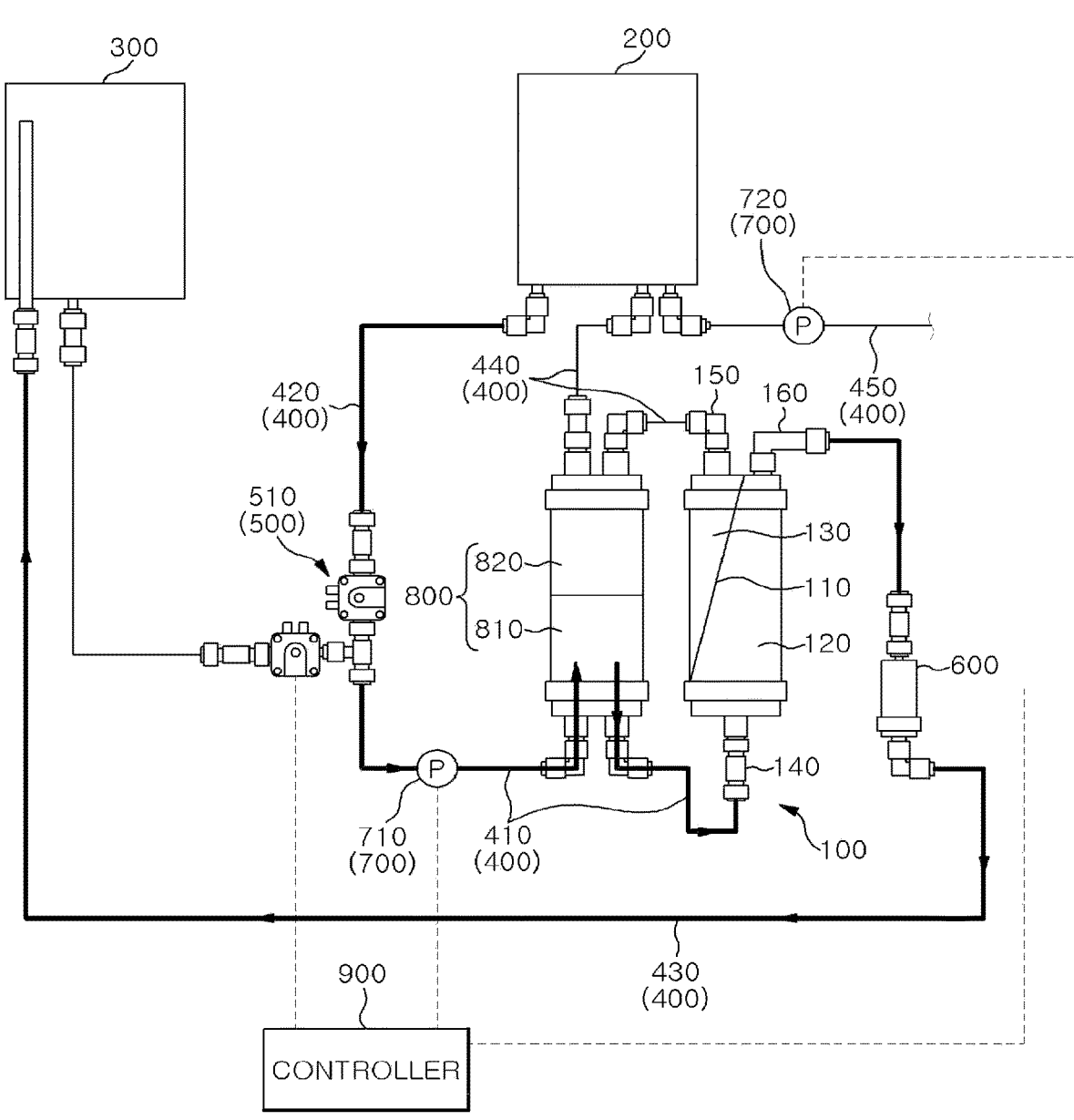
FIG. 3 is a diagram illustrating a flow path of raw water in a raw water sterilization mode in FIG. 1.

The raw water sterilization mode will be described with reference to FIG. 3. The raw water sterilization mode is a mode for sterilizing the raw water stored in the raw water storage unit 300. In the raw water sterilization mode, the controller 900 may open/close one or more valve modules such that raw water flows into the non-filtration part 120 and raw water discharged from the non-filtration part 120 flows into the raw water storage unit 300. In other words, in the raw water sterilization mode, the controller 900 may control the first valve module 510 to close the purified water supply passage 420. In addition, in the raw water sterilization mode, raw water may flow into the non-filtration part 120 via the pre-treatment filter 810.

Further, in the raw water sterilization mode, the controller 900 may drive the sterilization module 600 to sterilize the raw water discharged from the non-filtration part 120. In other words, in the raw water sterilization mode, the raw water stored in the raw water storage unit 300 may be sterilized by the sterilization module 600 and stored in the raw water storage unit 300 again.

In addition, in the raw water sterilization mode, the first pump 710 may pressurize the raw water flowing in the RO filter inlet passage 410 to the RO filter 100.

Figure 4:
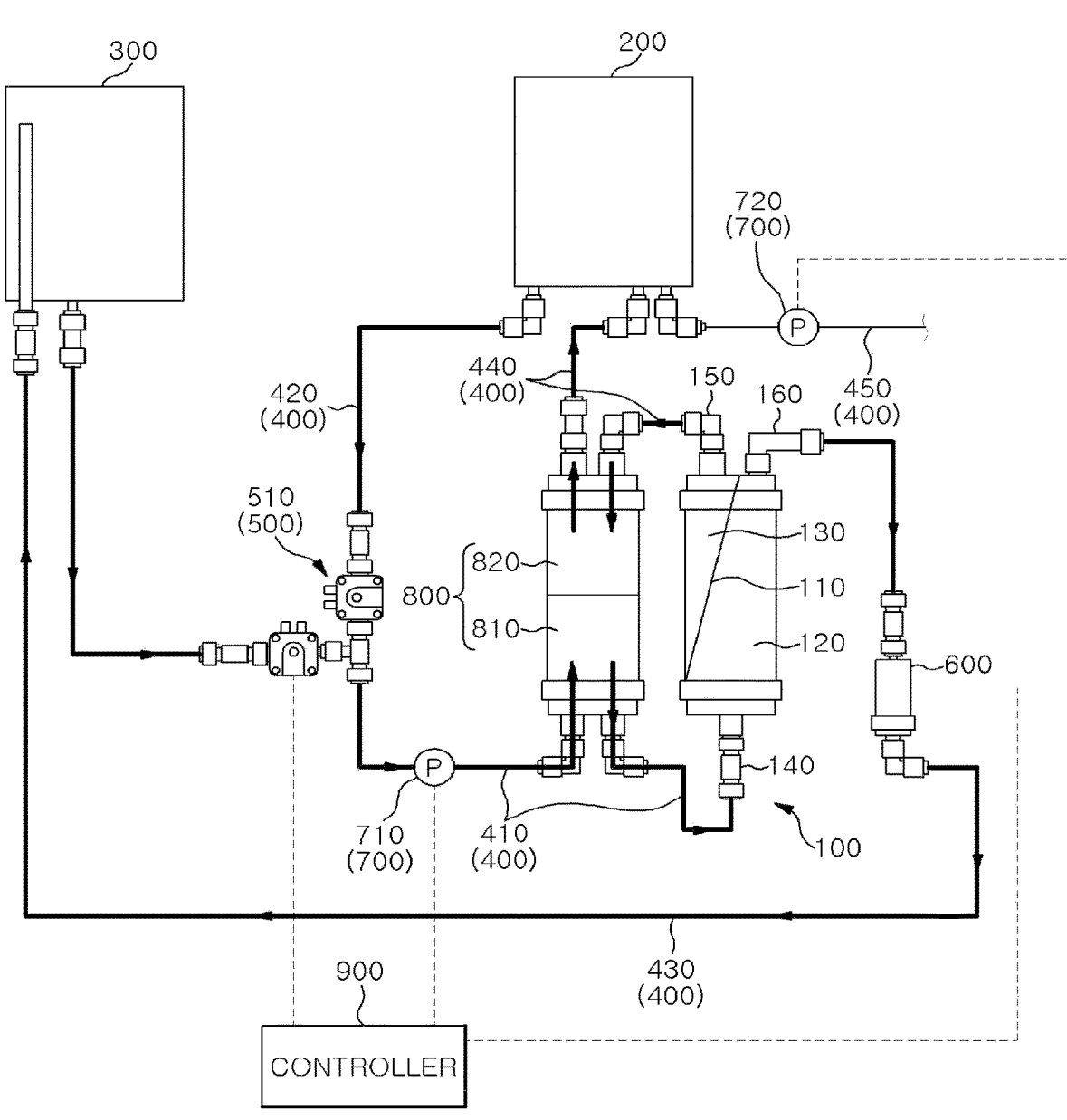
FIG. 4 is a diagram illustrating flow paths of purified water and raw water in a purified water circulation mode in FIG. 1.

The purified water circulation mode will be described with reference to FIG. 4. The purified water circulation mode is a mode in which purified water stored in the purified water storage unit 200 is circulated through the flow channel 400. In the purified water circulation mode, the controller 900 may open/close one or more valve modules such that the purified water stored in the purified water storage unit 200 and the raw water stored in the raw water storage unit 300 flow into the non-filtration part 120, the purified water discharged from the filtration part 130 flows into the purified water storage unit 200, and the raw water discharged from the non-filtration part 120 is stored in the raw water storage unit 300. In other words, in the purified water circulation mode, the controller 900 may control the first valve module 510 to open the RO filter inlet passage 410 and the purified water supply passage 420. In addition, in the purified water circulation mode, the raw water discharged from the raw water storage unit 300 and the purified water discharged from the purified water storage unit 200 may flow into the non-filtration part 120 via the pre-treatment filter 810, and the purified water discharged from the filtration part 130 may flow into the purified water storage unit 200 via the post-treatment filter 820.

Further, in the purified water circulation mode, the controller 900 may drive the sterilization module 600 to sterilize the raw water discharged from the non-filtration part 120. In other words, in the purified water circulation mode, sterilized raw water may flow into the purified water storage unit 200.

In addition, in the purified water circulation mode, the first pump 710 may pressurize the purified water and the raw water flowing in the RO filter inlet passage 410 to the RO filter 100.

Hereinafter, the purified water discharge mode will be described. The purified water discharge mode is a mode in which purified water stored in the purified water storage unit 200 is discharged to the outside of the water purifier 1. In the purified water discharge mode, the controller 900 may control one or more valve modules such that the purified water in the purified water storage unit 200 is discharged to the outside through the purified water discharge passage 450.

In addition, in the purified water discharge mode, the second pump 720 may pressurize the purified water flowing in the purified water discharge passage 450 to flow out of the water purifier 1.

Hereinafter, the operation and effects of the water purifier 1 according to the first embodiment of the present disclosure will be described.

The water purifier 1 according to the first embodiment of the present disclosure can flow raw water and purified water based on a plurality of flow modes, as described below.

In the flushing mode, the reverse osmosis membrane 110 is cleaned with purified water, thereby preventing impurities from being adsorbed on the reverse osmosis membrane 110 of the RO filter 100. In addition, flushing discharge water containing impurities may be sterilized by the sterilization module 600 and flow into the raw water storage unit 300, thereby preventing raw water from being contaminated.

In addition, in the raw water sterilization mode, raw water may be circulated through the raw water storage unit 300, the pre-treatment filter 810, the RO filter 100, and the raw water storage unit 300 sequentially, and sterilized by the sterilization module 600, so that the raw water in the raw water storage unit 300 can be prevented from being contaminated. In other words, even when the raw water storage unit 300 is provided to an install-free water purifier that does not require connection to a water pipe and raw water is not supplied through a water pipe, the raw water in the raw water storage unit 300 can be circulated and sterilized.

In addition, in the purified water circulation mode, purified water may be circulated through the purified water storage unit 200, the pre-treatment filter 810, the RO filter 100, the post-treatment filter 820, and the purified water storage unit 200 sequentially, so that purified water in the purified water storage unit 200 can be prevented from being contaminated. Further, in the purified water circulation mode, at least some of the raw water can be filtered into purified water by the RO filter 100 to flow into the purified water storage unit 200, so that purified water can be supplied to the purified water storage unit 200.

Hereinafter, with reference to FIGS. 5 to 7, a water purifier 1 according to a second embodiment of the present disclosure will be described.

In describing the second embodiment, there are difference compared to the above-described embodiments in that the purified water storage unit 200 and the raw water storage unit 300 may be integrally formed, the purified water discharge passage 450 may be connected to the purified water storage passage 440, and the valve unit 500 may further include a second valve module 520 and a third valve module 530, and these differences will be mainly explained, and the same description and reference numerals refer to the above-described embodiments.

Figure 5:
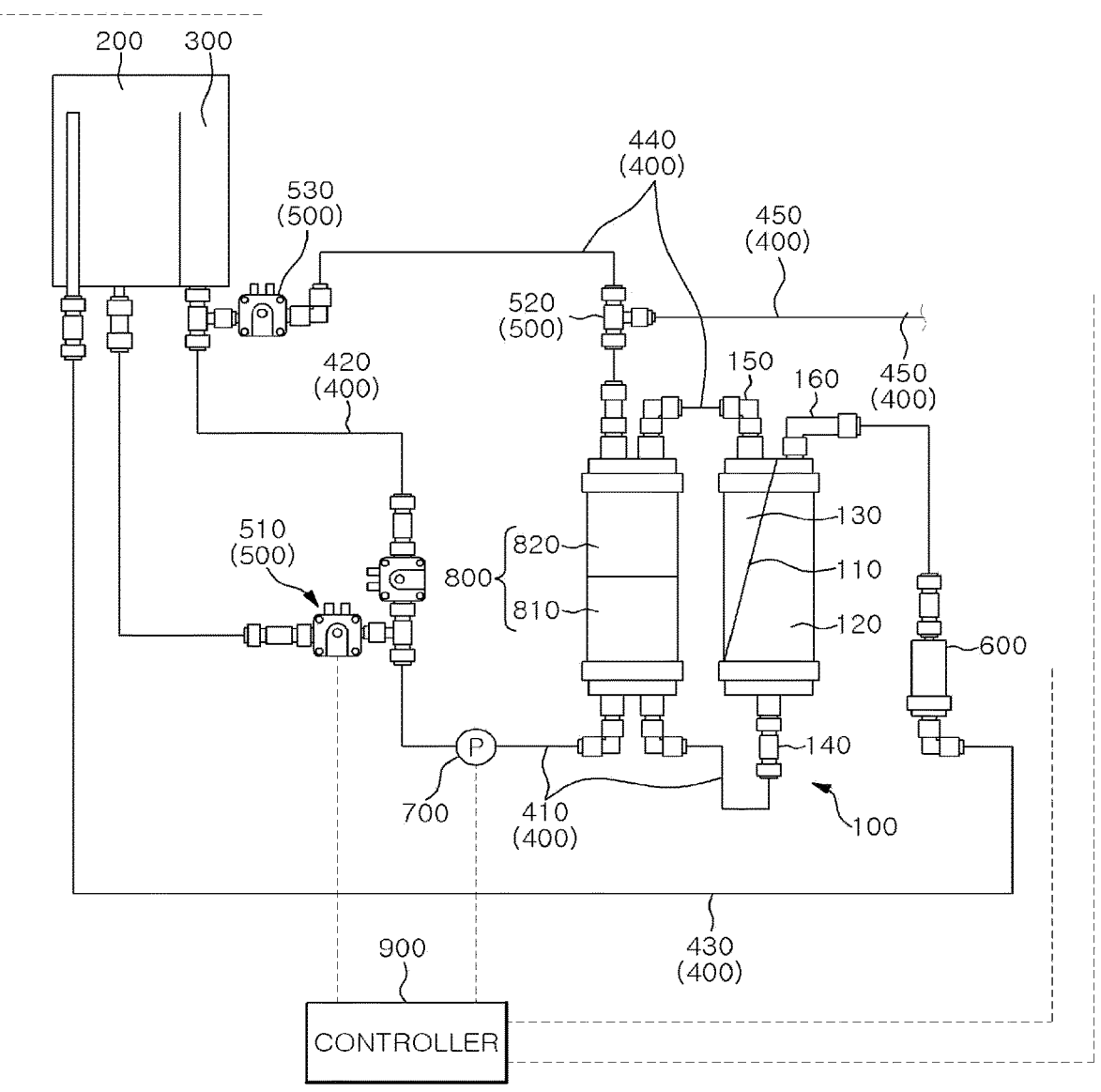
FIG. 5 is a diagram showing a water purifier according to a second embodiment of the present disclosure.

Referring to FIG. 5, the purified water storage unit 200 and the raw water storage unit 300 may be partitioned by a partition wall formed in one tank unit, but the present disclosure is not necessarily limited thereto. The RO filter inlet passage 410, the purified water supply passage 420, and the purified water storage passage 440 may be connected to the one tank unit.

The second valve module 520 may open/close the purified water discharge passage 450 such that purified water discharged from the purified water storage unit 200 is discharged to the outside of the water purifier 1 or purified water to be discharged from the RO filter 100 flows into the purified water storage unit 200. In other words, the second valve module 520 may open the purified water discharge channel 450 to allow purified water discharged from the purified water storage unit 200 to flow into the purified water discharge channel 450. In additional, the second valve module 520 may close the purified water discharge channel 450 to prevent purified water discharged from the RO filter 100 from flowing into the purified water discharge channel 450. For example, the second valve module 520 may be a three-way valve provided at the point where the purified water storage passage 440 and the purified water discharge passage 450 are joined.

The third valve module 530 may open/close the purified water supply passage 420 and the purified water storage passage 440. In other words, the third valve module 530 may open the purified water storage passage 440 and close the purified water supply passage 420 to allow purified water discharged from the purified water storage unit 200 to flow into the purified water supply passage 420 or to allow purified water discharged from the RO filter 100 to flow into the purified water storage unit 200. In addition, the third valve module 530 may open the purified water supply passage 420 and close the purified water storage passage 440 to allow purified water to be discharged from the purified water storage unit 200 to flow into the purified water supply passage 420. For example, the third valve module 530 may be a three-way valve simultaneously connected to the purified water storage unit 200, the purified water supply passage 420, and the purified water storage passage 440.

Figure 6:
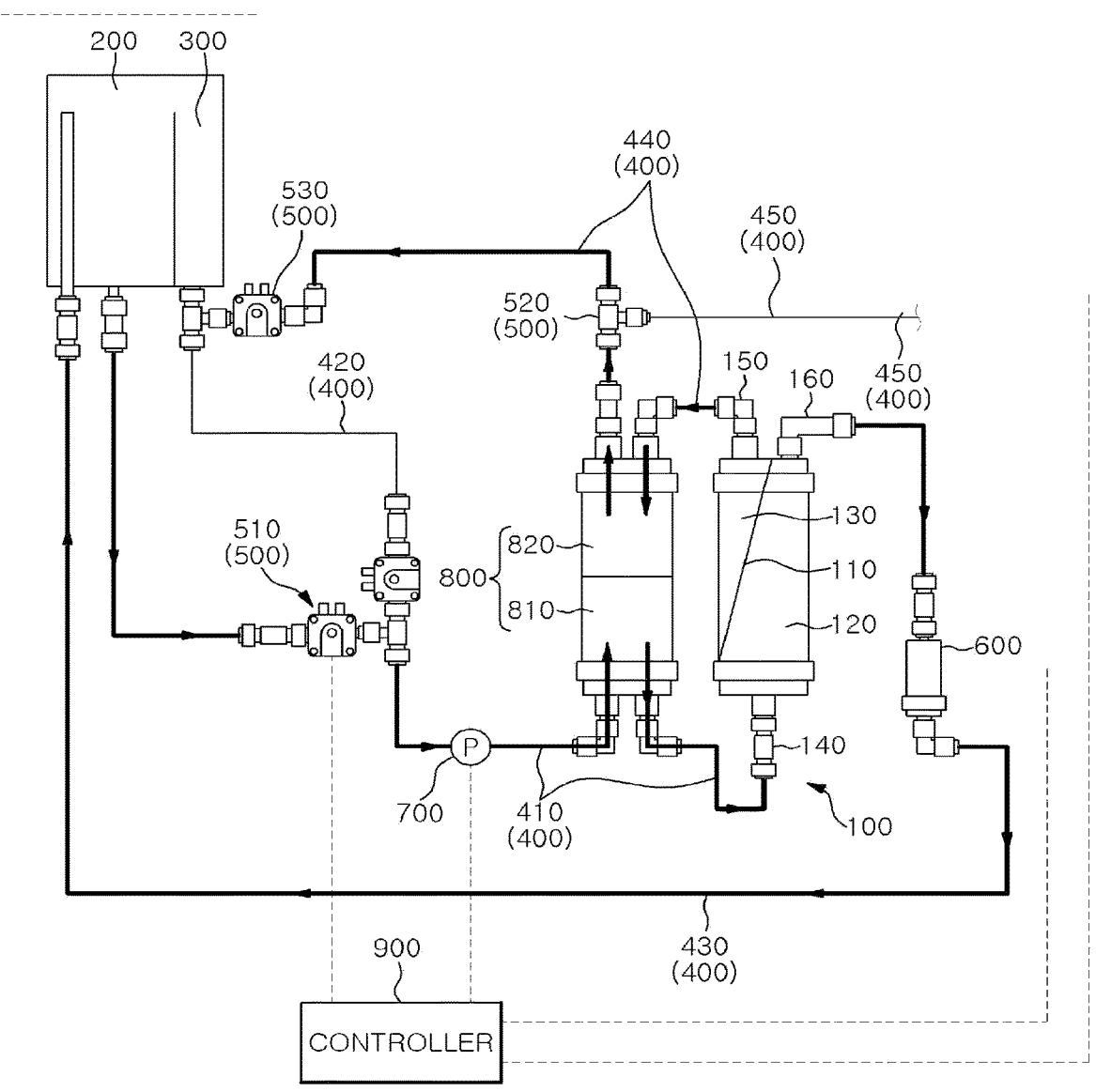
FIG. 6 is a diagram illustrating flow paths of raw water and purified water in a raw water sterilization mode in FIG. 5.

Further, referring to FIG. 6, in the raw water sterilization mode, the controller 900 may open/close one or more valve modules such that purified water discharged from the RO filter 100 flows into the purified water storage unit 200. In other words, in the raw water sterilization mode, the controller 900 may control the second valve module 520 and the third valve module 530 to close the purified water supply passage 420 and the purified water discharge passage 450 and open the purified water storage passage 440.

Figure 7:
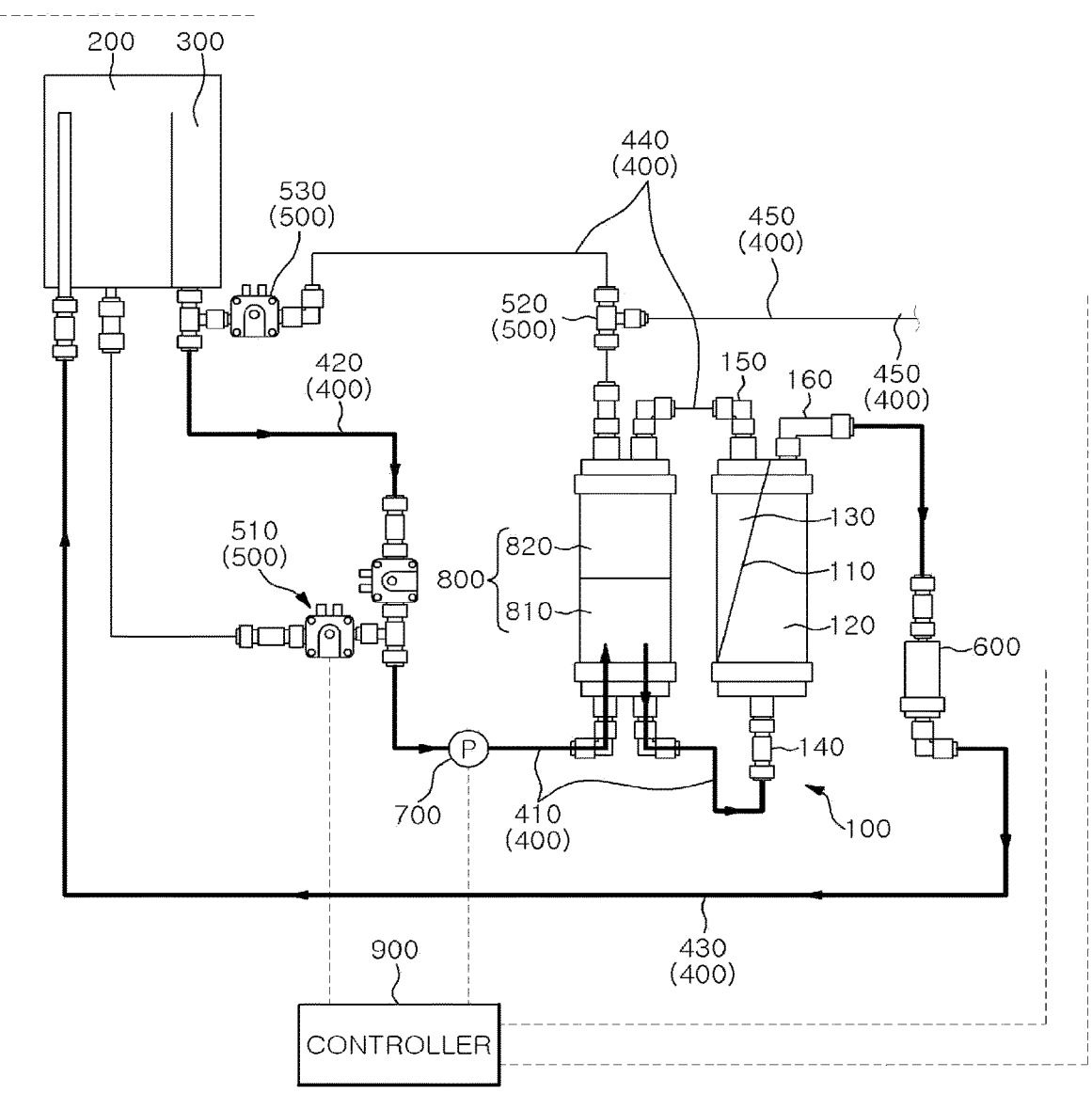
FIG. 7 is a diagram illustrating flow paths of raw water and purified water in a flushing mode in FIG. 5.

In addition, referring to FIG. 7, in the flushing mode, the controller 900 may open/close one or more valve modules such that purified water discharged from the purified water storage unit 200 flows into the RO filter 100. In other words, in the flushing mode, the controller 900 may control the second valve module 520 and the third valve module 530 to close the purified water storage passage 440 and open the purified water supply passage 420.

Further, in the purified water discharge mode, the controller 900 may open and close one or more valve modules such that the purified water discharged from the purified water storage unit 200 is discharged to the outside of the water purifier 1. In other words, in the purified water discharge mode, the controller 900 may control the second valve module 520 and the third valve module 530 to open the purified water storage passage 440 and the purified water discharge passage 450 and close the purified water supply passage 420.

Hereinafter, the operation and effects of the water purifier 1 according to the second embodiment of the present disclosure will be described.

In the water purifier 1 according to the second embodiment of the present disclosure, purified water discharged from the RO filter 100 can flow to the purified water storage unit 200 in the raw water sterilization mode, so the purified water to be used in the flushing mode can be supplied to the purified water storage unit 200. In addition, since raw water and purified water can be circulated through the raw water sterilization mode and flushing mode, it is possible to prevent the purified water in the purified water storage unit 200 and the raw water in the raw water storage unit 300 from being contaminated.

Hereinafter, with reference to FIGS. 8 to 11, a water purifier 1 according to a third embodiment of the present disclosure will be described.

Figure 8:
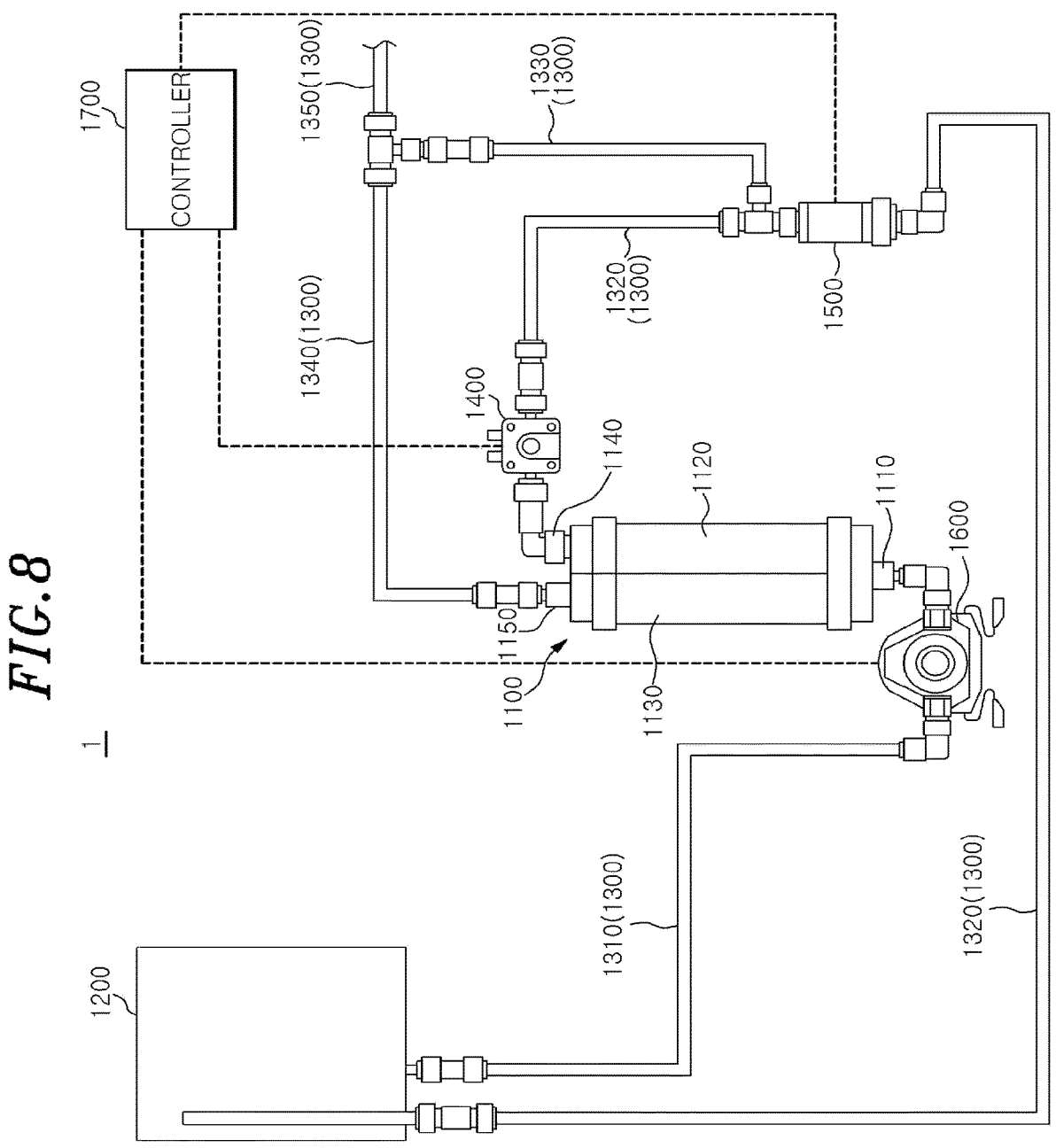
FIG. 8 is a diagram showing a water purifier according to a third embodiment of the present disclosure.

Referring to FIG. 8, the water purifier 1 according to the third embodiment of the present disclosure can provide clean water to the user by filtering water. For example, the water purifier 1 can filter water previously stored therein. In addition, the water purifier 1 may be an install-free water purifier that does not require connection to a water pipe. The water purifier 1 may include a filter member 1100, a raw water storage unit 1200, a flow channel 1300, a valve unit 1400, a sterilization module 1500, a pump unit 1600, and a controller 1700.

The filter member 1100 can filter incoming raw water. This filter member 1100 may include an inlet 1110, a first filtration part 1120, a second filtering part 1130, a first outlet 1140, and a second outlet 1150.

The inlet 1110 is an aperture for allowing the first filtration part 1120 to communicate with a filter inlet passage 1310 to be described later of the flow channel 1300. Raw water flowing in the filter inlet passage 1310 may flow into the first filtration part 1120 through the inlet 1110.

The first filtration part 1120 may filter raw water introduced through the inlet 1110 to provide first filtered water. In addition, the first filtration part 1120 may communicate with the first outlet 1140. By the first filtration part 1120, the first filtered water may flow into the second filtration part 1130 or be discharged through the first outlet 1140. For example, the first filtration part 1120 may include a nanotrap filter or an electrostatic filter. The electrostatic filter may be made of an electrostatic material to adsorb foreign substances contained in the inflowing water. For example, the material may be a nanotrap material.

The second filtration part 1130 may re-filter the first filtered water to provide second filtered water. In addition, the second filtration part 1130 may communicate with the second discharge port. By the second filtration part 1130, the second filtered water may be discharged through the second outlet 1150. For example, the second filtration part 1130 may include a carbon filter. The carbon filter may be a carbon block made by solidifying carbon powder into a cylindrical or polygonal shape.

The first filtration part 1120 and the second filtration part 1130 may be formed as one component, but are not limited thereto. In other words, the first filtration part 1120 and the second filtration part 1130 may be formed as separate components, and the filter member 1100 is not limited to a single filter.

The first outlet 1140 is an aperture for allowing the first filtration part 1120 to communicate with a circulation passage 1430 to be described later of the flow channel 1300. The first filtered water may flow into the circulation passage 1430 through the first outlet 1140.

The second outlet 1150 is an aperture for allowing the second filtration part 1130 to communicate with an output passage 1340 to be described later of the flow channel 1300. The second filtered water may flow into the output passage 1340 through the second outlet 1150.

The raw water storage unit 1200 may provide a space for storing raw water. The raw water may be provided to the filter member 1100 through the filter inlet passage 1310 of the flow channel 1300. In additionally, the raw water storage unit 1200 may not be connected to a water pipe.

The flow channel 1300 may provide a passage through which raw water, first filtered water, and second filtered water flow. The raw water, first filtered water, and second filtered water may flow between the filter member 1100, the raw water storage unit 1200, and the sterilization module 1500 through the flow channel 1300. In addition, the flow channel 1300 may include a filter inlet passage 1310, a circulation passage 1320, a flow passage 1330, a output passage 1340, and a discharge passage 1350.

The filter inlet passage 1310 may provide a passage for raw water to flow between the raw water storage unit 1200 and the inlet 1110 of the filter member 1100. The filter inlet passage 1310 may communicate with the raw water storage unit 1200 and the inlet 1110 of the filter member 1100. For example, the filter inlet passage 1310 may be disposed between the raw water storage unit 1200 and the filter member 1100. Raw water may flow from the raw water storage unit 1200 toward the inlet 1110 of the filter member 1100 through the filter inlet passage 1310.

The circulation passage 1320 may provide a passage through which at least one of the first filtered water and the second filtered water may flow. The circulation passage 1430 may communicate with the first outlet 1140 and the raw water storage portion 1200. In addition, the circulation passage 1430 may be joined with the flow passage 1330. At least one of the first filtered water and the second filtered water may flow into the raw water storage unit 1200 through the circulation passage 1430.

The flow passage 1330 may provide a passage through which the second filtered water may flow. The flow passage 1330 may be connected to the output passage 1340 and the circulation passage 1430. For example, the flow passage 1330 may be disposed between the output passage 1340 and the circulation passage 1430. The second filtered water may flow into the circulation passage 1430 through the flow passage 1330.

The output passage 1340 may provide a passage through which the second filtered water output from the second outlet 1150 may flow. The output passage 1340 may communicate with the second outlet 1150 and may be joined with the flow passage 1330. The second filtered water output from the second outlet 1150 may flow into the flow passage 1330 through the output passage 1340. In addition, the portion where the output passage 1340 and the flow passage 1330 are joined may be located between the first outlet 1140 and the sterilization module 1500 on the circulation passage 1430.

The discharge passage 1350 may provide a passage for discharging the second filtered water to the outside. The discharge passage 1350 may be connected to the output passage 1340 so that the second filtered water discharged from the output passage 1340 may flow in the discharge passage 1350. The second filtered water may be discharged to the outside through the discharge passage 1350.

The valve unit 1400 may include one or more valve modules that are selectively opened/closed to control the flow of raw water, first filtered water, and second filtered water in the flow channel 1300. For example, the valve module may be provided on the first outlet 1140 to selectively open/close the first outlet 1140. In other words, when the valve module is opened, the first filtered water can be discharged from the first outlet 1140, and when the valve module is closed, the second filtered water can be discharged from the second outlet 1150.

The sterilization module 1500 can sterilize the first filtered water output from the first outlet 1140 and the second filtered water output from the second outlet 1150. In addition, the sterilization module 1500 may be disposed in the circulation passage 1430. In other words, the sterilization module 1500 can sterilize the first filtered water and the second filtered water flowing in the circulation passage 1430. The sterilization module 1500 can sterilize the first filtered water and the second filtered water by providing sterilizing substances to the first filtered water and the second filtered water or through electrolysis.

The pump unit 1600 can pressurize raw water to flow into the filter member 1100. In addition, the pump unit 1600 may pressurize the first filtered water toward the first outlet 1140 or the second filtration part 1130, or pressurize the second filtered water toward the second outlet 1150. The pump unit 1600 may be provided in the filter inlet passage 1310.

The controller 1700 may control the opening/closing of one or more valve modules based on a plurality of flow modes, and control the sterilization module 1500. The plurality of flow modes may include a raw water sterilization mode, a filter cleaning mode, and a purified water discharge mode.

Figure 9:
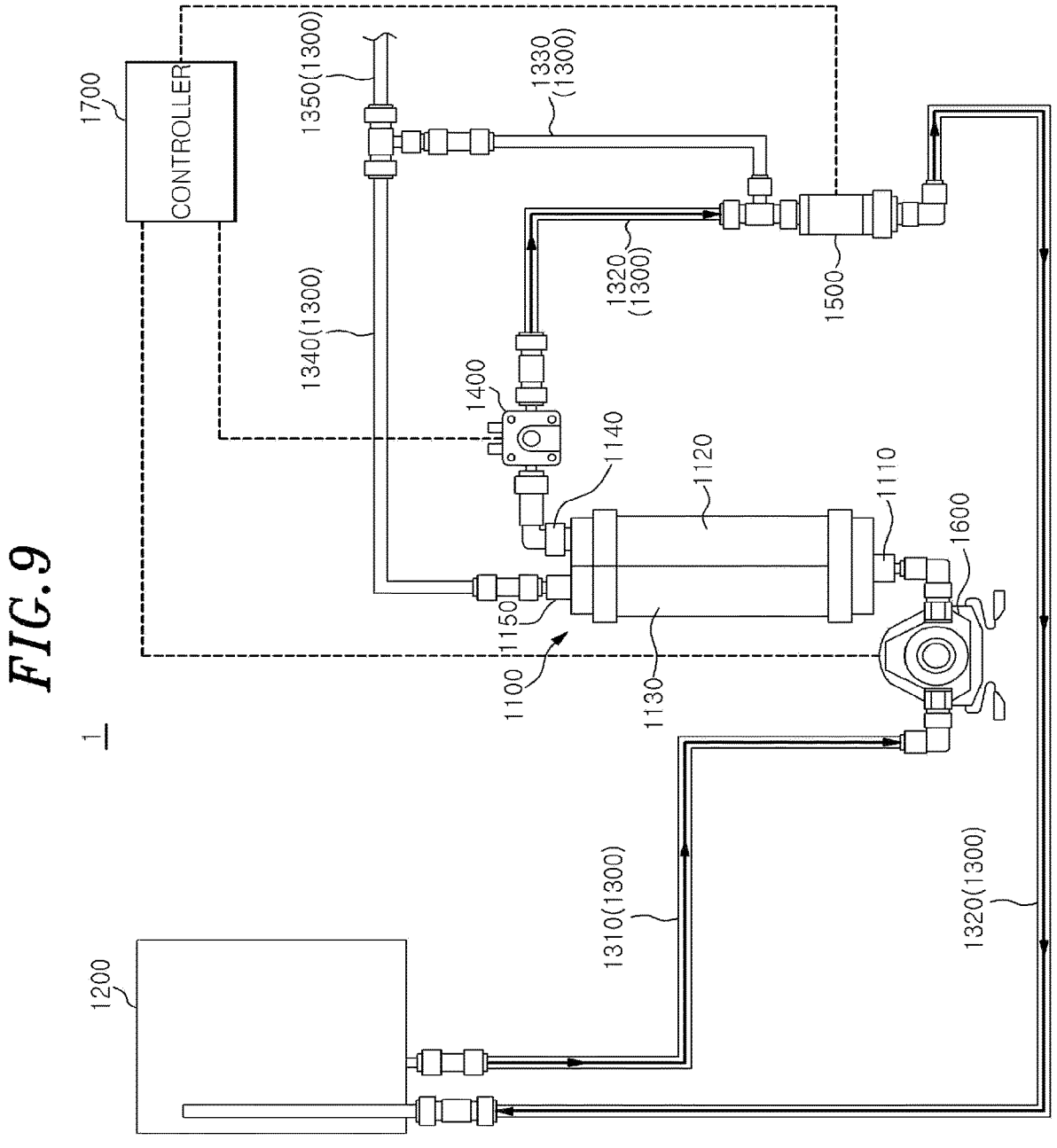
FIG. 9 is a diagram illustrating flow paths of raw water and first filtered water in a raw water sterilization mode in FIG. 8.

Referring further to FIG. 9, the raw water sterilization mode is a mode for sterilizing raw water in the raw water storage unit 1200. In the raw water sterilization mode, the controller 1700 may control the opening/closing of one or more valve modules such that the raw water discharged from the raw water storage unit 1200 flows into the first filtration part 1120 through the inlet 1110 and the first filtered water output from the first outlet 1140 flows to the raw water storage unit 1200 via the sterilization module 1500. For example, in the raw water sterilization mode, the controller 1700 may control the valve module to open the first outlet 1140. In addition, the controller 1700 may drive the sterilization module 1500 to sterilize the first filtered water in the raw water sterilization mode. Further, in the raw water sterilization mode, the pump unit 1600 is controlled by the controller 1700 to pressurize the raw water with a predetermined first pressing force so that the raw water flows into the first filtration part 1120 through the inlet 1110. In the raw water sterilization mode, raw water may be filtered in the first filtration part 1120, sterilized by the sterilization module 1500, and stored again in the raw water storage unit 1200.

Figure 10:
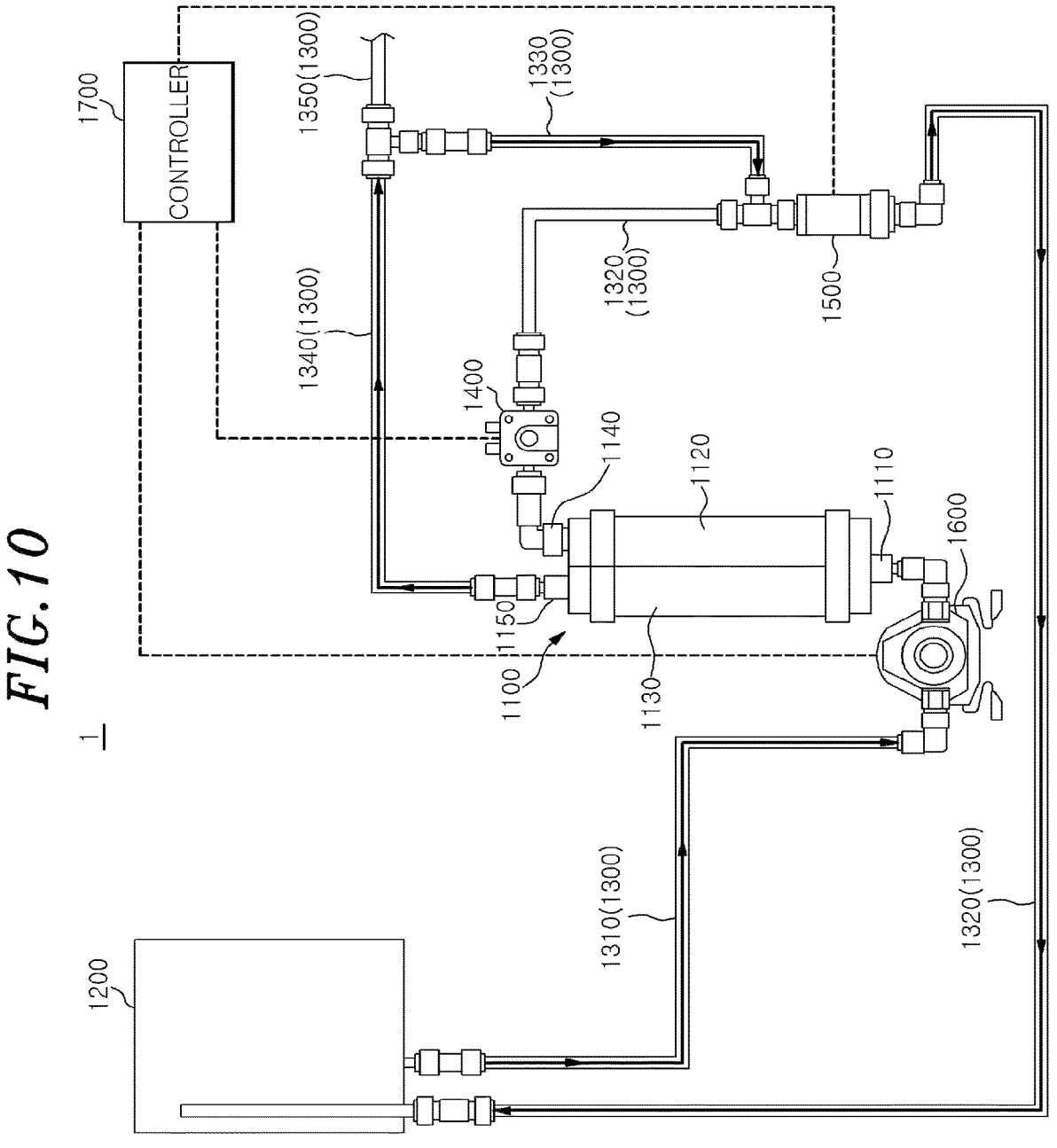
FIG. 10 is a diagram illustrating flow paths of raw water and second filtered water in a filter cleaning mode in FIG. 8.

Referring further to FIG. 10, the filter cleaning mode is a mode for cleaning the filter member 1100. In the filter cleaning mode, the controller 1700 may open/close one or more valve modules such that the raw water discharged from the raw water storage unit 1200 flows into the inlet 1110, and the second filtered water output from the second outlet 1150 flows toward the raw water storage unit 1200. For example, in the filter cleaning mode, the controller 1700 may control the valve module to close the first outlet 1140. In the filter cleaning mode, the second filtered water may be defined as water that has been used to clean the filter member 1100. In addition, the controller 1700 may drive the sterilization module 1500 to sterilize the second filtered water in the filter cleaning mode. Further, in the filter cleaning mode, the pump unit 1600 is controlled by the controller 1700 to pressurize the raw water with a second pressing force greater than the first pressing force so that raw water passes through the first filtration part 1120 through the inlet 1110 and flows into the second filtration part 1130. In the filter cleaning mode, the raw water may clean the filter member 1100, be sterilized by the sterilization module 1500, and be stored again in the raw water storage unit 1200.

In addition, the filter cleaning mode may be performed after the raw water sterilization mode. In other words, raw water filtered by the filter member 1100 and sterilized by the sterilization module 1500 may flush the filter member 1100.

Figure 11:
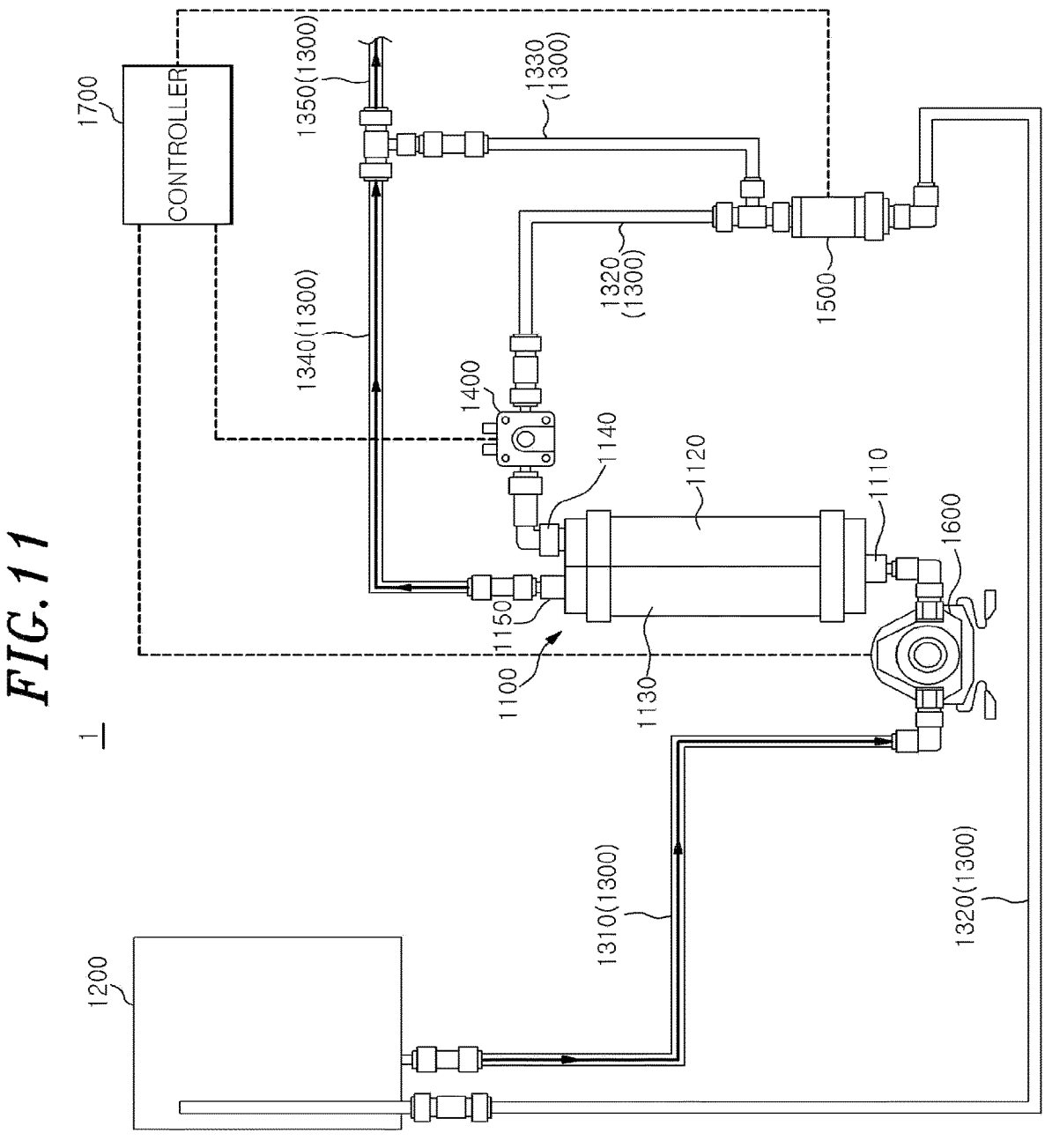
FIG. 11 is a diagram illustrating flow paths of raw water and second filtered water in a water discharge mode in FIG. 8.

Referring further to FIG. 11, the purified water discharge mode is a mode for discharging purified water. In the purified water discharge mode, the controller 1700 may open/close one or more valve modules to discharge the second filtered water output from the second outlet 1150 to the outside. For example, in the purified water discharge mode, the controller 1700 may control the valve module to close the first outlet 1140. In the purified water discharge mode, the second filtered water may be defined as purified water. In addition, in the purified water discharge mode, the pump unit 1600 is controlled by the controller 1700 to pressurize the raw water with the second pressing force greater than the first pressing force so that raw water passes through the first filtration part 1120 through the inlet 1110 and flows into the second filtration part 1130. In the purified water discharge mode, the second filtered water may be discharged to the outside through the output passage 1340 and the discharge passage 1350.

In addition, the purified water discharge mode may be performed after the filter cleaning mode. In other words, purified water filtered in the cleaned filter member 1100 may be discharged to the outside.

The above-described controller 1700 may be implemented by a computing device including a microprocessor, a measuring device such as a sensor, a memory, and since the implementation method is obvious to those skilled in the art, more detailed description thereof will be omitted.

Hereinafter, the operation and effects of the water purifier 1 according to the third embodiment of the present disclosure will be described.

In the water purifier 1 according to the third embodiment of the present disclosure, in the raw water sterilization mode, raw water is circulated between the raw water storage unit 1200 and the filter member 1100, and the raw water is sterilized by the sterilization module 1500, so that contamination of the raw water in the storage unit 1200 can be prevented. In other words, even when the raw water storage unit 1200 is provided to an install-free water purifier that does not require connection to a water pipe and is thus not supplied with raw water through a water pipe, the raw water in the raw water storage unit 1200 can be circulated and sterilized.

In the filter cleaning mode, raw water can circulate through the raw water storage unit 1200 and the filter member 1100 and clean the filter member 1100, thereby preventing impurities from accumulating in the filter member 1100. In addition, the second filtered water containing impurities can be sterilized by the sterilization module 1500 and then introduced into the raw water storage unit 1200, thereby preventing the raw water in the raw water storage unit 1200 from being contaminated.

In addition, since the filter cleaning mode is performed after the raw water sterilization mode, the raw water filtered by the filter member 1100 and sterilized by the sterilizing module 1500 can clean the filter member 1100, so that impurities of the filter member 1100 can be cleaned more efficiently.

Further, since the purified water discharge mode can be performed after the filter cleaning mode, purified water filtered through the cleaned filter member 1100 can be provided to the user.

The examples of the present disclosure have been described above as specific embodiments, but these are only examples, and the present disclosure is not limited thereto, and should be construed as having the widest scope according to the technical idea disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A water purifier comprising:
an RO filter including a non-filtration part into which raw water flows, a filtration part which discharges purified water, and a reverse osmosis membrane that partitions the non-filtration part and the filtration part and filters the raw water into the purified water;
a purified water storage unit for storing the purified water;
a raw water storage unit for storing the raw water;
a flow channel that provides a passage through which the raw water and the purified water flow;
a valve unit including one or more valve modules selectively opened and closed to control the flow of the raw water and the purified water in the flow channel;
a sterilization module for sterilizing the raw water discharged from the non-filtration part; and
a controller for controlling the opening/closing of the valve modules and controlling the sterilization module based on a plurality of flow modes,
wherein the plurality of flow modes includes a flushing mode for flushing the reverse osmosis membrane with the purified water from the purified water storage unit, and
wherein in the flushing mode, the controller opens/closes the one or more valve modules such that the purified water discharged from the purified water storage unit flows into the non-filtration part and flushing discharge water discharged from the non-filtration part flows toward the raw water storage unit, and drives the sterilization module to sterilize the flushing discharge water.

2. The water purifier of claim 1, further comprising:
a filter module including a pre-treatment filter for pre-treating the raw water supplied to the RO filter,
wherein the plurality of flow modes further include a raw water sterilization mode for sterilizing the raw water stored in the raw water storage unit, and
wherein in the raw water sterilization mode, the controller opens/closes the one or more valve modules such that the raw water flows into the non-filtration part through the pre-treatment filter and the raw water discharged from the non-filtration part flows into the raw water storage unit, and drives the sterilization module.

3. The water purifier of claim 2, wherein the controller opens/closes the one or more valve modules such that the purified water discharged from the filtration part flows into the purified water storage unit in the raw water sterilization mode.

4. The water purifier of claim 1, wherein the plurality of flow modes further include a purified water circulation mode in which the purified water stored in the purified water storage unit circulates through the flow channel, and
wherein in the purified water circulation mode, the controller opens/closes the one or more valve modules such that the purified water stored in the purified water storage unit and the raw water stored in the raw water storage unit flow into the non-filtration part, and the purified water discharged from the filtration part flows into the purified water storage unit.

5. The water purifier of claim 4, wherein in the purified water circulation mode, the raw water is discharged from the non-filtration part and flows into the raw water storage unit, and
wherein the controller drives the sterilization module in the purified water circulation mode.

6. The water purifier of claim 4, further comprising:
a filter module including a post-treatment filter for post-treating the purified water discharged from the filtration part,
wherein the purified water flows into the purified water storage unit through the post-treatment filter in the purified water circulation mode.

7. The water purifier of claim 1, wherein the flow channel includes:
an RO filter inlet passage which communicates with the raw water storage unit and provides a passage for either the raw water or the purified water to flow into the RO filter;
a purified water supply passage which is joined to the RO filter inlet passage and provides a passage for the purified water discharged from the purified water storage unit to flow into the RO filter inlet passage;
a circulation passage which provides a passage for the raw water discharged from the non-filtration part to flow into the raw water storage unit and communicates with the raw water storage unit; and
a purified water storage passage which provides a passage for the purified water discharged from the filtration part to flow into the purified water storage unit, and
wherein the sterilization module is disposed in the circulation passage.

8. The water purifier of claim 1, wherein the purified water storage unit and the raw water storage unit are formed separately from each other.

9. The water purifier of claim 1, wherein the purified water storage unit and the raw water storage unit are integrally formed.

10. A water purifier comprising:

a filter member including an inlet through which raw water is introduced, a first filtration part for filtering the raw water introduced through the inlet to provide first filtered water, a second filtration part for re-filtering the first filtered water to provide second filtered water, a first outlet for outputting the first filtered water, and a second outlet for outputting the second filtered water;

a raw water storage unit that stores the raw water;

a flow channel providing a passage through which the raw water, the first filtered water, and the second filtered water flow;

a valve unit including one or more valve modules that are selectively opened/closed to control the flow of the raw water, the first filtered water, and the second filtered water in the flow channel;

a sterilization module for sterilizing the first filtered water output from the first outlet and the second filtered water output from the second outlet; and a controller for controlling the opening/closing of the valve module based on a plurality of flow modes and controlling the sterilization module, wherein the plurality of flow modes include a raw water sterilization mode for sterilizing the raw water of the raw water storage unit, wherein in the raw water sterilization mode, the controller opens/closes the one or more valve modules such that the raw water discharged from the raw water storage unit flows into the first filtration part through the inlet, and the first filtered water output from the first outlet flows into the raw water storage unit via the sterilization module, and wherein the sterilization module sterilizes the first filtered water in the raw water sterilization mode.

11. The water purifier of claim 10, wherein the plurality of flow modes include a filter cleaning mode for cleaning the filter member, wherein in the filter cleaning mode, the controller opens/closes the one or more valve modules such that the raw water discharged from the raw water storage unit flows into the inlet, and the second filtered water output from the second outlet flows toward the raw water storage unit, and wherein the sterilization module sterilizes the second filtered water in the filter cleaning mode.

12. The water purifier of claim 11, further comprising:

a pump unit for pressurizing the raw water into the inlet, wherein the pump unit pressurizes the raw water with a predetermined first pressing force so that the raw water flows through the inlet into the first filtration part in the raw water sterilization mode, and pressurizes the raw water with a predetermined second pressing force so that the raw water passes through the first filtration part through the inlet and flows into the second filtration part in the filter cleaning mode, the second pressing force being greater than the first pressing force.

13. The water purifier of claim 10, wherein the flow channel includes:

a filter inlet passage connected to the raw water storage unit and the inlet to provide a passage for the raw water to flow between the raw water storage unit and the inlet; and a circulation passage connected to the first outlet and the raw water storage unit to provide a passage for the first filtered water output from the first outlet to flow into the raw water storage unit, and wherein the sterilization module is provided in the circulation passage.

14. The water purifier of claim 13, wherein the flow channel further includes:

a flow passage joined to the circulation passage to provide a passage for the second filtered water output from the second outlet to flow, wherein a portion where the flow passage and the circulation passage are joined is located between the first outlet and the sterilization module on the circulation passage, and wherein the second filtered water flowing in the flow passage flows to the raw water storage unit through the circulation passage.

15. The water purifier of claim 10, wherein the first filtration part includes a nanotrap filter or an electrostatic filter, and the second filtration part includes a carbon filter.

\* \* \* \* \*